(12) United States Patent
Ridao

(10) Patent No.: US 11,761,654 B1
(45) Date of Patent: Sep. 19, 2023

(54) ECO-FRIENDLY METHOD FOR MAINTAINING AIR CONDITIONERS

(71) Applicant: Christian Ridao, Hialea, FL (US)

(72) Inventor: Christian Ridao, Hialea, FL (US)

( * ) Notice: Subject to any disclaimer, the term of this patent is extended or adjusted under 35 U.S.C. 154(b) by 33 days.

(21) Appl. No.: 17/096,879

(22) Filed: Nov. 12, 2020

Related U.S. Application Data

(60) Provisional application No. 62/934,186, filed on Nov. 12, 2019.

(51) Int. Cl.
*F24F 11/30* (2018.01)

(52) U.S. Cl.
CPC ......... *F24F 11/30* (2018.01); *F24F 2221/225* (2013.01)

(58) Field of Classification Search
CPC ........ F24F 11/30; F24F 2221/225; F24F 1/32; F25B 41/40; Y10S 137/901
See application file for complete search history.

(56) References Cited

U.S. PATENT DOCUMENTS 4,184,661 A * 1/1980 Kushner ................. F25B 41/40
62/299
2012/0291897 A1 11/2012 Ridao

OTHER PUBLICATIONS

"NIBCO® Lead Free Soldering Recommendations". NIBCO® Inc. YouTube Channel. https://www.youtube.com/watch?v=NZ10n1FDwRw (Year: 2013).*

* cited by examiner

*Primary Examiner* — Edelmira Bosques
*Assistant Examiner* — Brett Peterson Mallon
(74) *Attorney, Agent, or Firm* — Troy & Schwartz, LLC; Susan Dierenfeldt-Troy

(57) ABSTRACT

A method which eliminates the need to remove environmentally-unsafe hydrochloro-fluorocarbons from an air conditioning system prior to the removal of the system's evaporator coil for cleaning is disclosed. The method also eliminates the cutting and soldering steps which must be conducted on the air conditioner system's copper refrigerant transport lines every time an evaporator coil is now removed for cleaning. The method utilizes a reversibly separable ball valve assembly unit affixed to each of the AC system's two refrigerant transport lines to achieve removal of refrigerant from the evaporator coil and its subsequent safe storage within other components of the air-conditioning system until the cleaned evaporator coil is reinstalled and the refrigerant's flow into and out of the cleaned evaporator is restored according to the disclosed method.

4 Claims, 8 Drawing Sheets

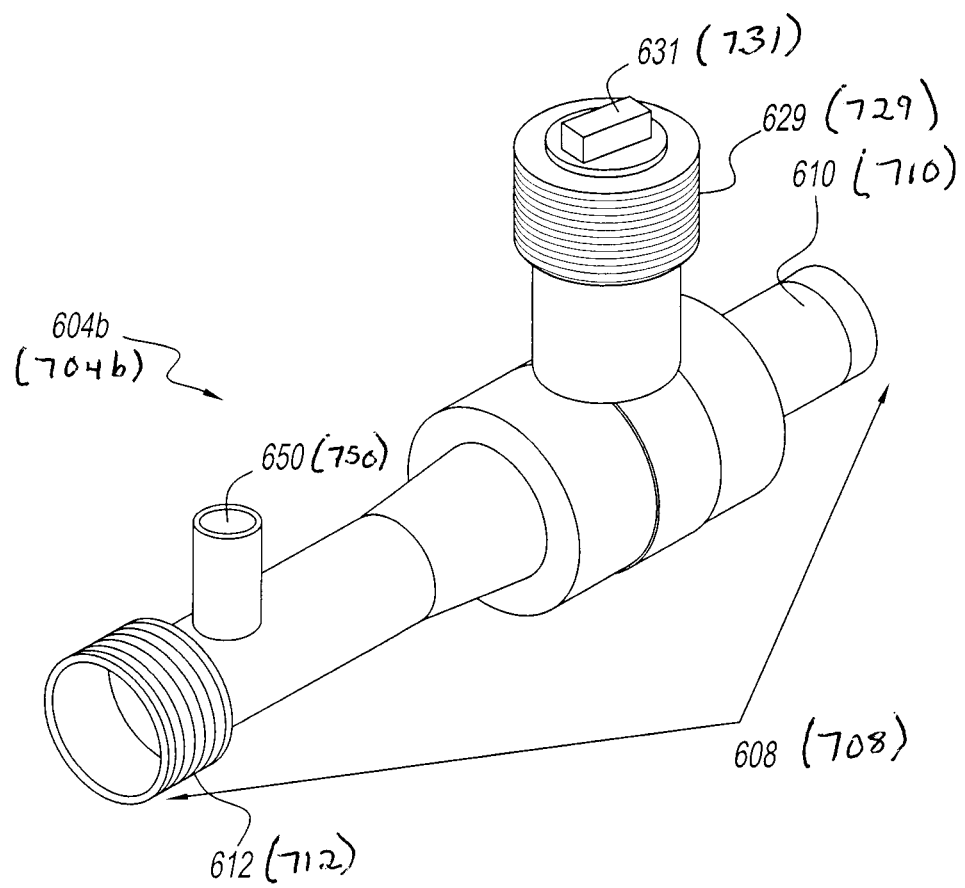
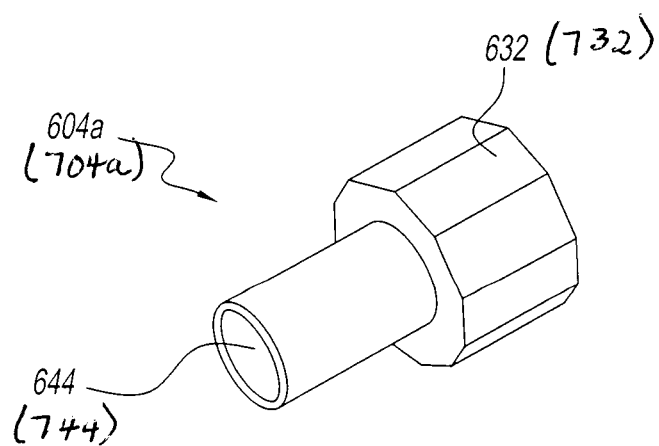
FIG. 2

FIG. 3A

Refrigerant pumped out of entire AC system using equipment placed near outside compressor and stored in a special container.

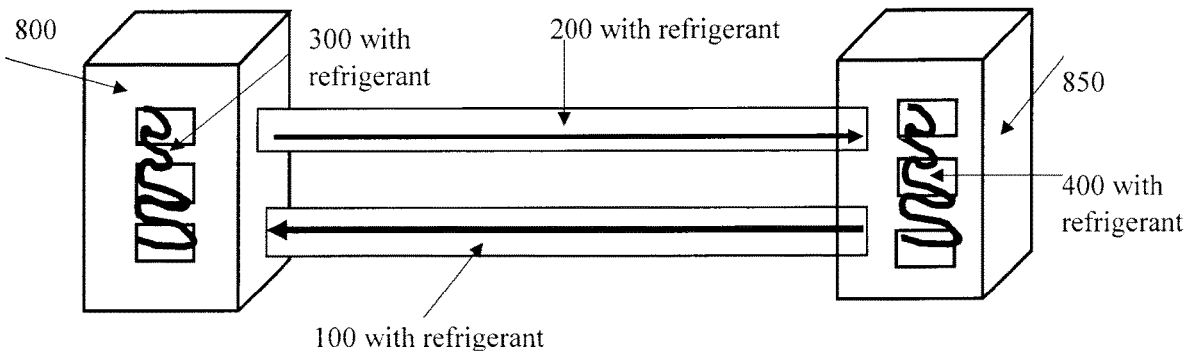

FIG. 3B

Both copper lines cut after refrigerant removed to allow removal of the now emptied evaporator coil and attached segments 614a and 714a from housing unit

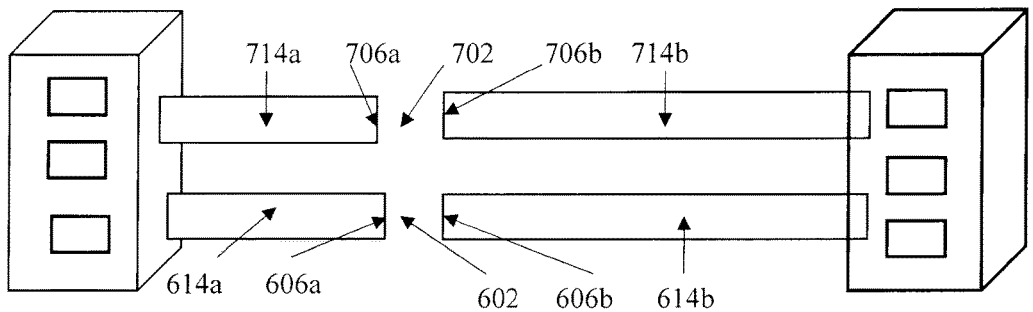

FIG. 3C

Evaporator coil reinstalled. AC system recharged with previously collected refrigerant after ends of cut copper lines soldered.

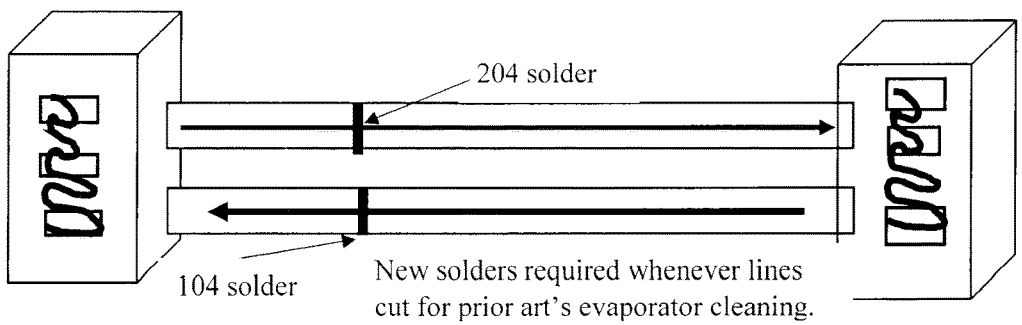

AC REFRIGERANT REMOVAL

ECO-FRIENDLY METHOD FOR MAINTAINING AIR CONDITIONERS

This application claims priority to provisional patent application No. 62/934,196 filed on Nov. 12, 2019.

This amended specification contains no new material.

BACKGROUND

Air-conditioning systems ("AC systems") are ever present in both residences and commercial buildings throughout the world. These systems work through effective heat transfer to achieve cooling using a refrigerant having very high heat-absorbing properties and the ability of changing state from a vapor to a liquid and back again under pressure as it circulates through the AC system. Air conditioner units AC systems are generally comprised of an outdoor unit and an indoor unit. For the purposes of this invention, the relevant component of the outside unit is the condenser coil, and the relevant component of the indoor unit is the evaporator coil. Refrigerant is continuously pulled into the evaporating coil and condenser coil by the AC system's compressor via copper tubes running between the two coils.

Hydrochlorofluorocarbons (HCFCs) such as Freon®, also known as HCFC-22 and R-22, have been the refrigerants of choice for decades because of their desirable cooling properties. Despite their obvious usefulness as a coolant, HCFCs have a serious environmental downside: ozone depletion and global warming.

Initially refrigerant flows from the outside condenser coil towards the inside evaporator coil through what is referred to in the art as the high-pressure line. The evaporator coil is continuously exposed to the flow of warm air from the building's individual rooms drawn towards it by the AC system's blower through return air ducts. Refrigerant circulating through the evaporator coil's copper tubes undergoes transformation from a liquid to a vaporous state and reaches its low boiling point rapidly as it absorbs heat from the warmed air. As the result of the absorption of heat energy by the refrigerant within the evaporator coil, the resulting cooled airflow is pushed by the blower into the building's air supply ducts throughout the building to provide cooler air.

After leaving the evaporator coil, refrigerant, now in its gaseous state, is transported through the unit's insulated conduit housing through what is referred to in the art as the low-pressure line to the AC system's out door unit that contains a compressor, condenser coil, and fan. The compressor's purpose is to pressurize the incoming low-pressure, heated refrigerant gas by raising its temperature to convert the refrigerant to a superheated hot high-pressure gas. The resultant high pressure forces the refrigerant through a line that leads to the outdoor condenser coil. As it enters and flows through the condenser coil, the superheated refrigerant transfers its heat to the outside air so the refrigerant inside loses heat and changes from a hot gas to a hot liquid. A fan helps drive heated air away from the unit. Upon leaving the condenser coil, refrigerant, now as a heated liquid, flows back to the evaporator coil and the cycle starts again when the hot liquid passes through the evaporator coil's expansion valve.

Optimal performance of any AC system requires regular maintenance. For example, AC systems generally rely on replaceable or washable filters as a first line of defense for protecting the integrity of the indoor AC unit by entrapping dust, pet hair, mold spores, and the like before they can reach the evaporator coil which is generally located downstream from the indoor unit's air filter. Frequent replacement of air filters is highly recommended to help keep any AC unit running efficiently. The removal of dirty filters and installation of new filters involves easy steps that can be readily performed by anybody.

To achieve optimal performance, air conditioners should also occasionally be subjected to more intensive maintenance procedures. These procedures include the periodic cleaning of the inside evaporator coil due to the accumulation of dust, dirt, pet hair and the like despite the regular replacement of new filters. Evaporator coils can also become damaged as the result of volatile organic compounds (VOCs) which are introduced into the inside of buildings by cleaning products, aerosol air fresheners, adhesives for craft products, and other commonly-used products. VOCs can cause refrigerant passage hole leaks in the evaporator coil through which environmentally unfriendly HCFCs can leak out.

Once the integrity of the evaporator coil is affected, the unit's air efficiency decreases, leading to an increase in energy costs because more energy is required to achieve the desired cooling level. Evaporator coil cleaning will then generally be required to restore the system to optimal performance. If the inside evaporator coil is actually leaking, its replacement will likely be required, costing hundreds of dollars.

AC system evaluation and cleaning of the evaporator coil should ordinarily be left to properly licensed professionals to avoid the release of or contact with the refrigerant. For example, generally, the AC system must first be cleared of the refrigerant prior to the removal of the evaporator coil. The refrigerant removal step requires the careful handling of refrigerant during the removal process ensures that it is properly handled and recovered with a certified recovery machine. Such careful handling is also required to protect the health of the AC technician and any nearby people and animals since Freon® inhalation can result in serious health consequences and even death. In fact, Section 608 of the Clean Air Act lists specific procedures that must be followed for recovery and disposal of Freon®. Only certified personnel who have passed exams given by the EPA are allowed to remove or recover Freon® and dispose of it.

The existing evaporator coil cleaning procedure is time consuming, a potential environmental and safety hazard, and can run into hundreds of dollars, thereby discouraging many from having their AC system's evaporator coil occasionally cleaned by a professional. The disclosed invention is an eco-friendly solution to the existing cumbersome evaporator cleaning procedure described above because: 1) it entirely eliminates the currently required refrigerant collection step and in this way substantially minimizes the well-known environmental and health safety hazards associated with HCFCs should they inadvertently be released into the atmosphere or inhaled/ingested by humans or animals during the refrigerant collection process; and 2) it will encourage home and building owners to more frequently have their AC units maintained at a lower cost and with less hassle, thereby reducing energy consumption.

BRIEF DESCRIPTION OF THE DRAWINGS

FIG. 2 is a perspective view showing the ball valve element and the ball valve connector element, both of which comprise the ball valve assembly, wherein a ball valve assembly is connected to both the high-pressure line and the low-pressure line of the AC system to practice the method.

Since the same ponents are found in both valve assembly units, the figure applies to both units. For clarity sake, when referring to the ball valve assembly for the AC system's low-pressure line, the parts are referred to as "700 series" part numbers. For the high-pressure line, the parts are referred to as "600 series" part numbers.

FIGS. 3A, 3B, and 3C are front planar views showing the existing method for removing an AC system's evaporator coil from its housing unit for cleaning after refrigerant is isolated from the AC system and collected outside in a specialized container for storing HCFCs.

Figure 4A:
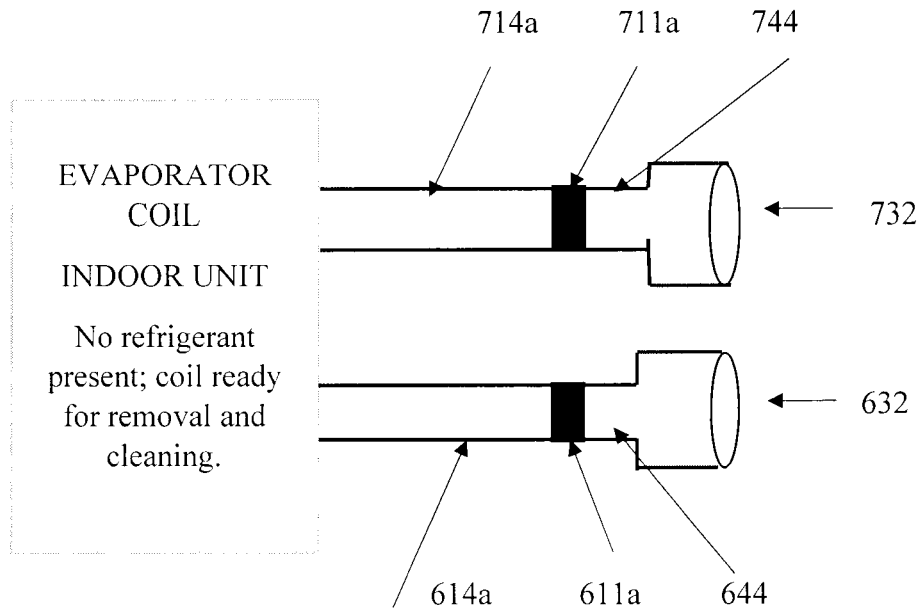

FIG. 4A is a front planar view showing the ball valve connecting element soldered to the evaporator coil side segment of the cut low-pressure line and the cut high-pressure line shown in FIG. 3B.

Figure 4B:
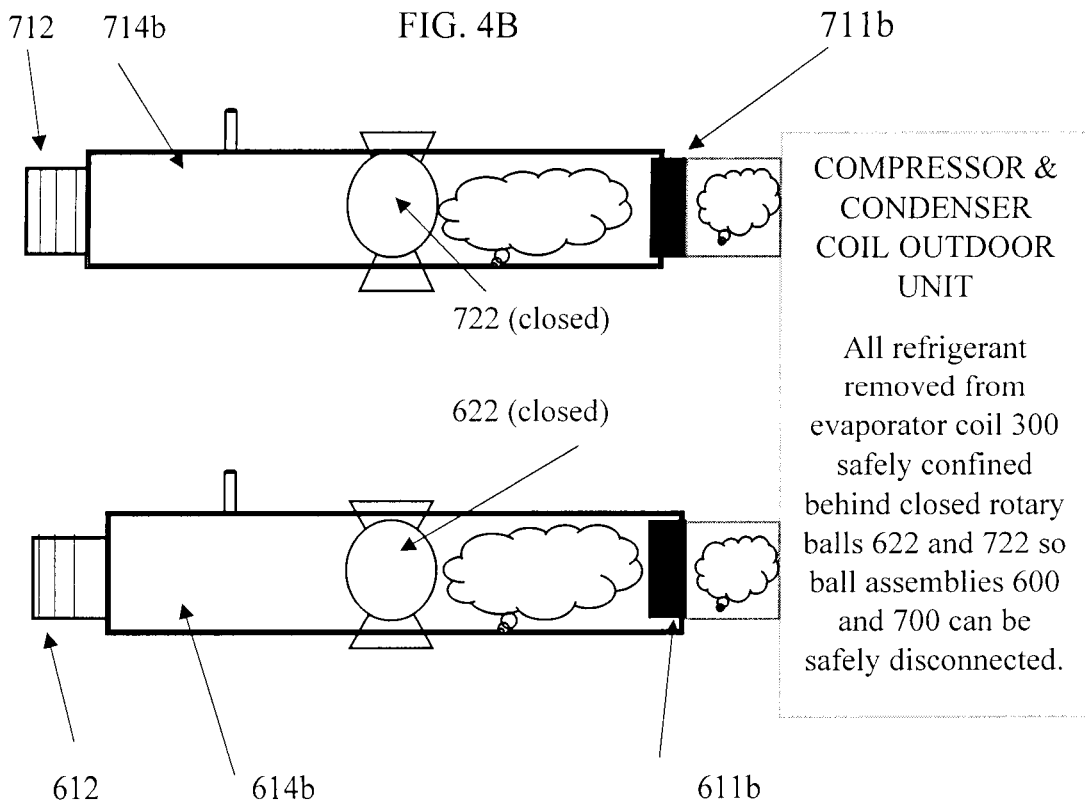

FIG. 4B is front planar view showing the ball valve element soldered to the condenser coil side segment of the cut low-pressure line and the cut high-pressure line shown in FIG. 3B.

Figure 5:
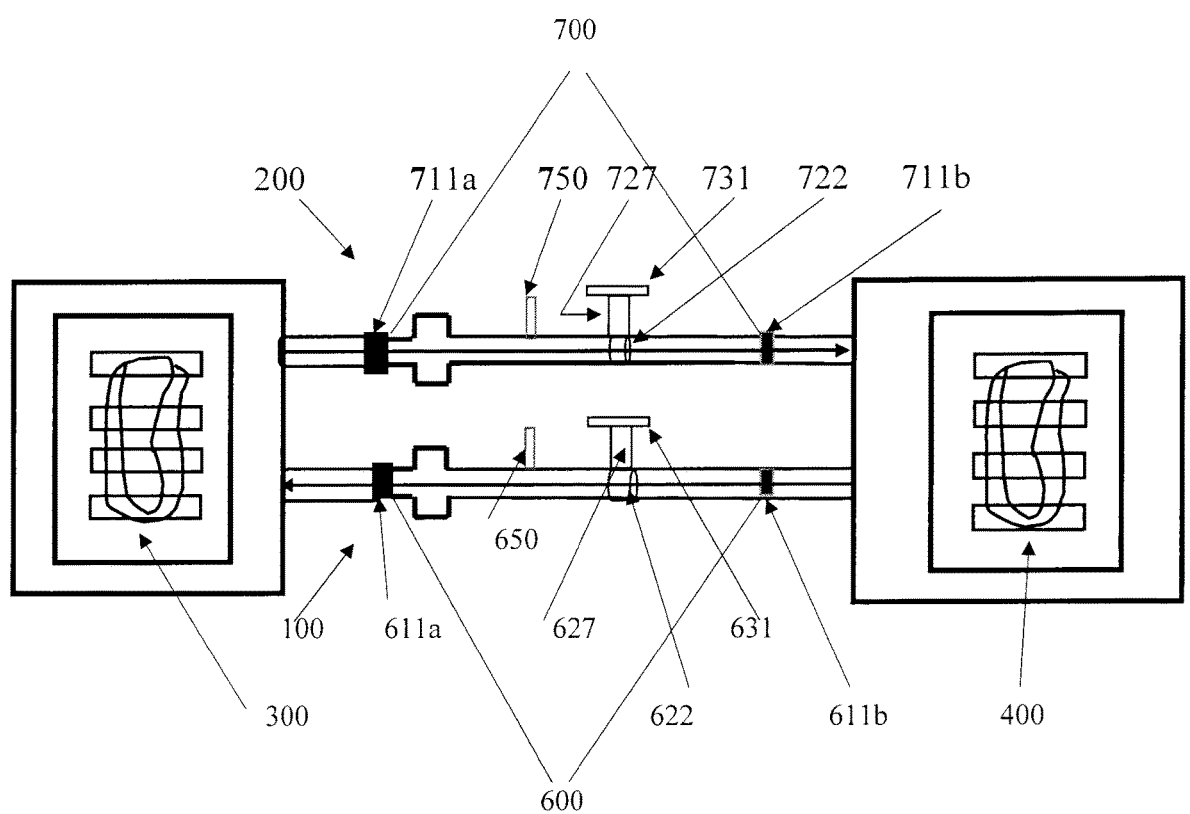

FIG. 5 is a front planar view of the high-pressure line and the low-pressure line's operatively connected ball valve element and ball valve connecting element where refrigerant is flowing through the ball valve assembly units of both the low-pressure and high-pressure lines.

Figure 6A:
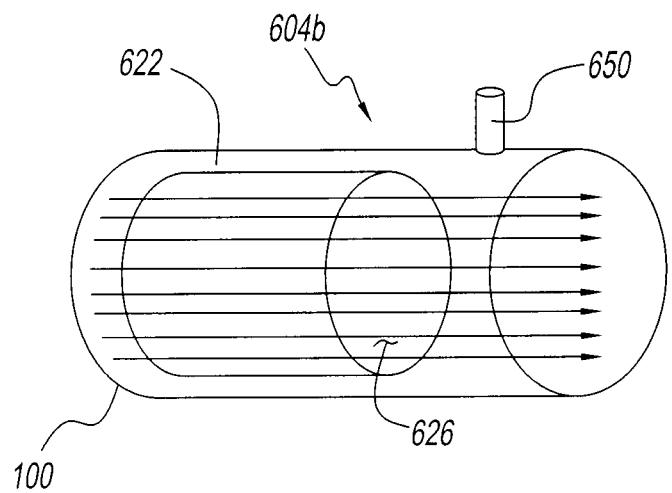

FIG. 6A is a front planar view showing the flow of refrigerant through the ball valve element's rotary ball's refrigerant passage hole on its way to the evaporator coil.

Figure 6B:
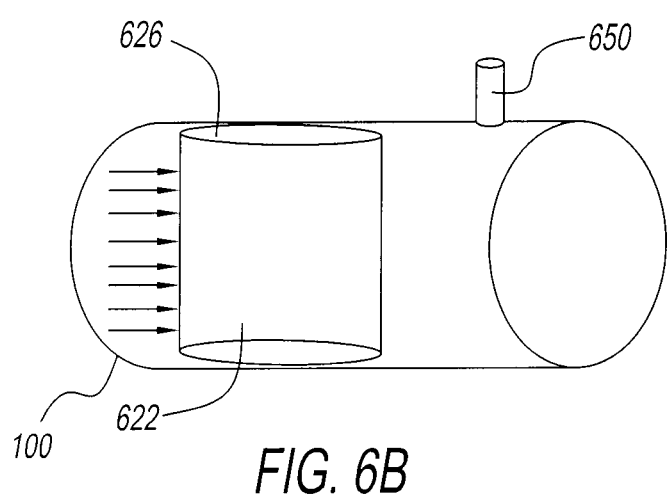

FIG. 6B is a front planar view showing the retention of the refrigerant behind the ball valve element's rotary ball as the result of an adjustment of the rotary ball by 90 degrees wherein the rotary ball's refrigerant passage hole is no longer accessible to the refrigerant.

Figure 7:
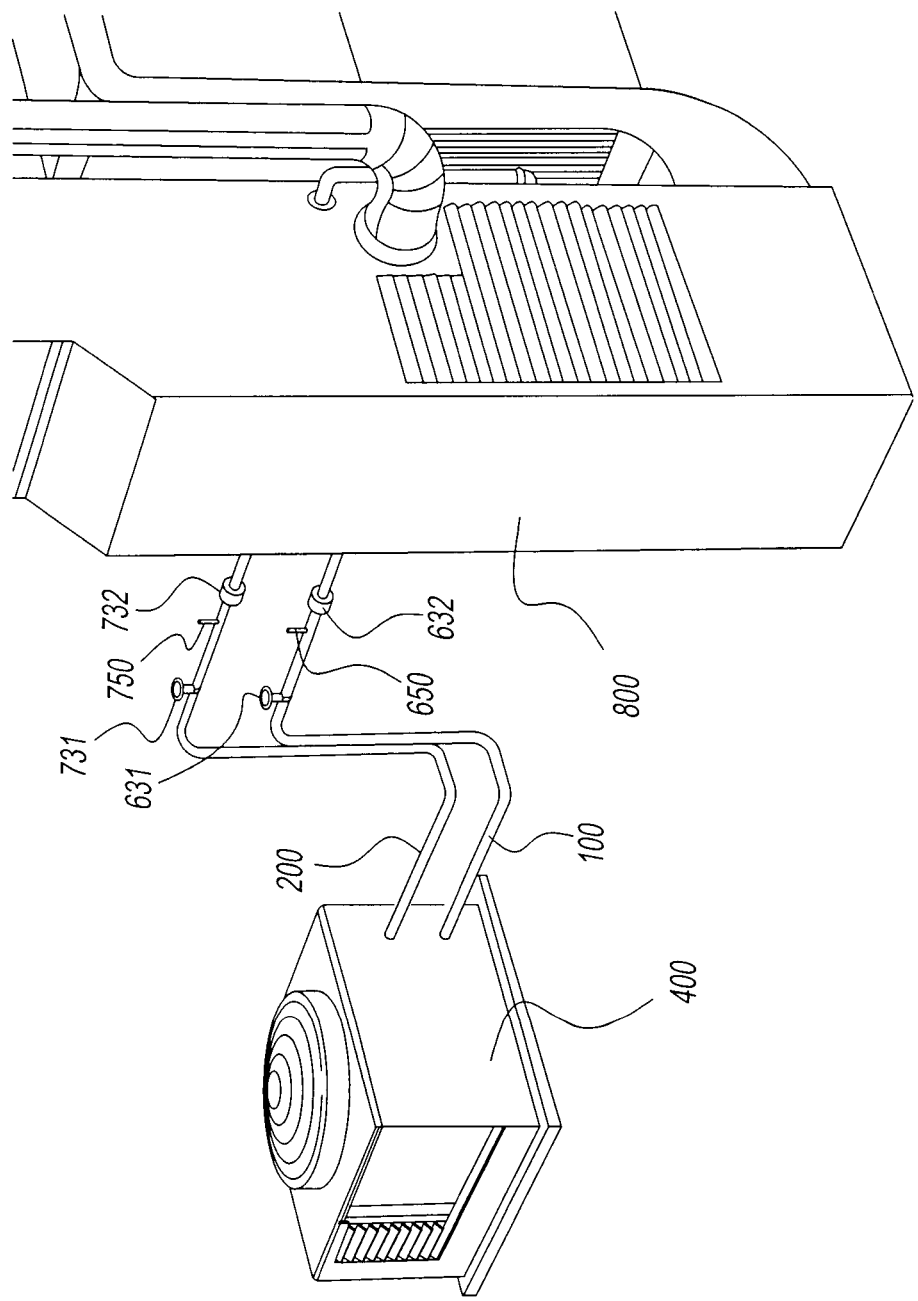

FIG. 7 is a perspective view showing an AC system with an operatively connected ball assembly unit on both the high-pressure line and the low-pressure line.

Figure 8:
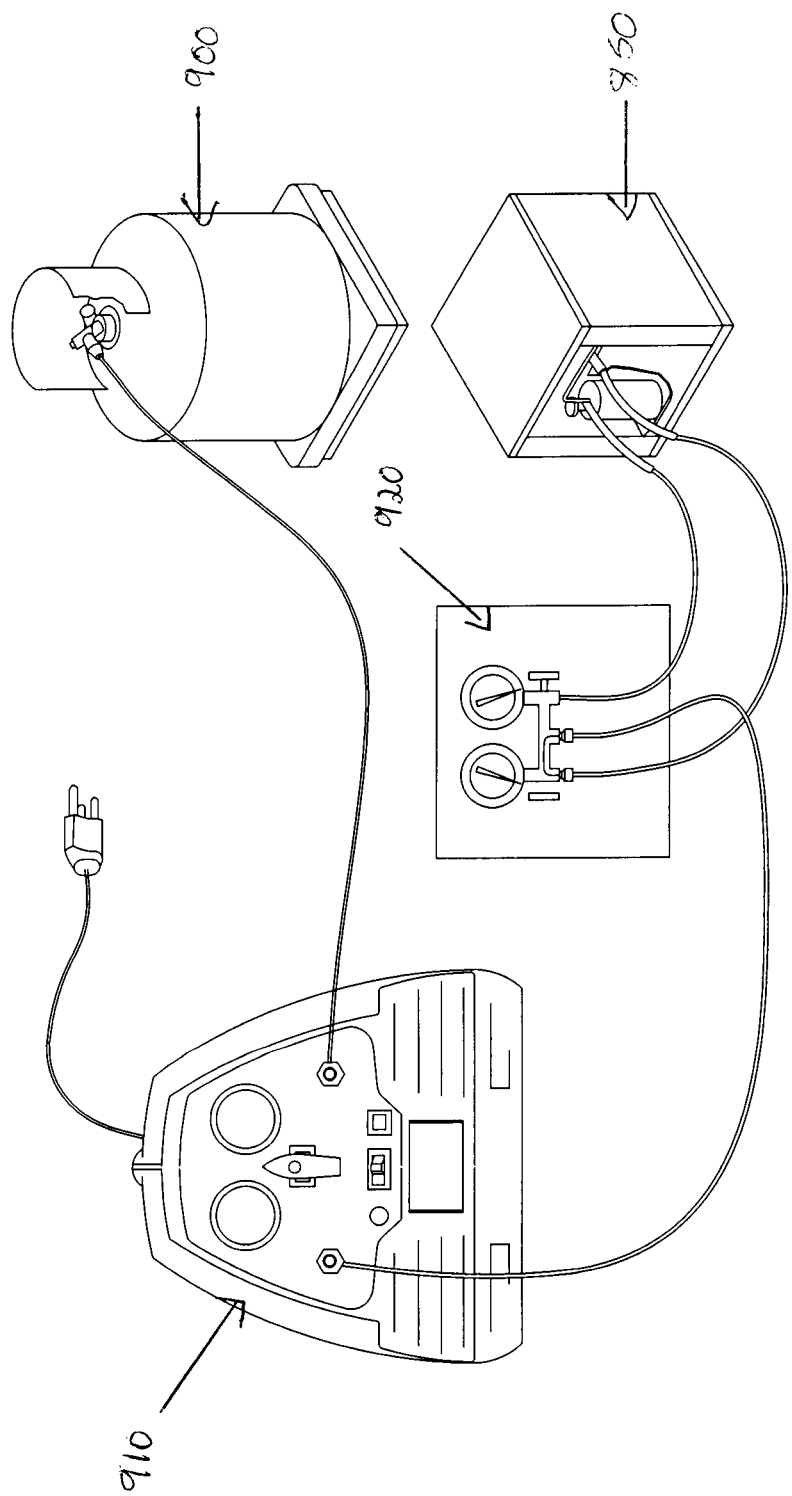

FIG. 8 is a perspective view of the prior art's required process for collecting refrigerant from an AC system prior to removing the evaporator coil for cleaning. The method eliminates this step once the ball valve assembly units shown in FIG. 2 are installed.

DETAILED DESCRIPTION OF THE INVENTION

Figure 1:
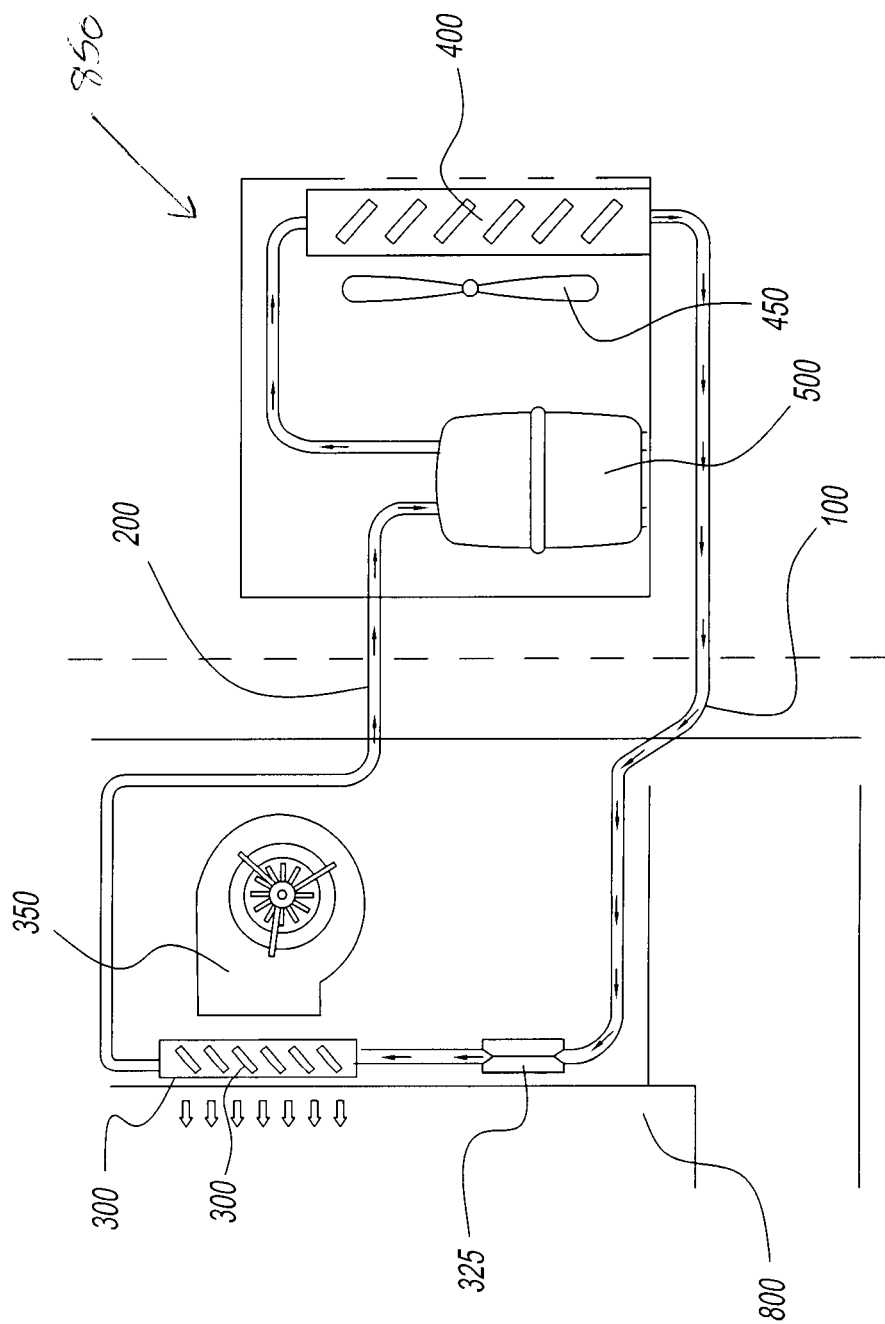
FIG. 1 is a prospective view showing the components of a typical AC system.

Referring to FIG. 1, the typical AC system comprises an indoor evaporator coil 300 positioned in a housing unit 800 located indoors and a compressor 500 and condenser coil 400 positioned in an outdoors housing unit 850. The evaporator coil 300 and condenser coil 400 are connected by a high-pressure copper line 100 and a low-pressure outbound line copper line 200. Low-pressure line (outbound line) 200 carries the refrigerant exiting evaporator coil 300 compressor 500 on its way to condenser coil 400. High-pressure line (inbound line) 100 carries the refrigerant from condenser coil 400 to evaporator coil 300.

Evaporator coil 300 is continuously exposed to the flow of warm air from individual rooms drawn towards the building's return air ducts by the AC system's blower 350. Liquid refrigerant circulating through the evaporator's copper tubes undergoes transformation to a vaporous state and reaches its low boiling point rapidly as it absorbs heat from the warm air. With its heat energy extracted by the evaporator coil, the cooled airflow is pushed by the blower into the building's air supply ducts throughout the building.

After leaving evaporator coil 300, the refrigerant, now in its gaseous state, is transported through the AC system's insulated conduit housing through low-pressure line 200 to the AC system's outdoor housing component 850 that contains the AC system's compressor 500 and into condenser coil 400 and blower 450. The compressor's purpose is to pressurize the incoming low-pressure warm refrigerant gas by raising the gas's temperature to convert the refrigerant to a hot high-pressure gas. This high pressure forces the refrigerant through a line that leads to the outdoor condenser coil 400. As it enters and flows through condenser coil 400, the superheated refrigerant transfers its heat to the outside air causing the refrigerant inside the condenser coil to lose heat and change from a hot gas to a hot liquid. A blower 450 drives the heated air away from the compressor/condenser coil.

Upon leaving condenser coil 400, the now hot liquid refrigerant flows back to the evaporator coil 300 through high-pressure line 100 and the cycle starts again when the hot liquid passes through the evaporator coil's expansion valve 325. Expansion valve 325 cools the hot liquid refrigerant flowing through the high-pressure line 100 prior to entering the actual evaporator coil 300. In sum, the refrigerant enters the evaporator coil 300 as a liquid capable of absorbing heat from a building or room and exits the evaporator coil as a gas capable of giving off heat into the outside environment to return to a liquid state.

Referring again to FIG. 1 and now FIGS. 3A, 3B, 3C and 8, the removal of the evaporator coil 300 for cleaning purposes currently involves the cumbersome steps of: 1) first collecting and storing refrigerant pumped out of the entire AC system in a special refrigerant recovery tank 900 placed near the compressor/condenser coil housing unit 850; and 2) cutting the high-pressure and low-pressure copper lines 100 and 200. The refrigerant collection method requires a pump 910 connected to the condenser coil 400 via gauges 920 to monitor the refrigerant's removal from the AC system's condenser coil 400, evaporator coil 300, high-pressure line 100 and lower pressure line 200 wherein the "pumped" refrigerant is delivered to refrigerant recovery tank 900. Safety and environmental concerns necessitate collecting the refrigerant flowing through the AC system to prevent its release into the air or from coming into contact with a person. Only when refrigerant is completely moved from the AC system's lines and coils should the AC technician proceed with the line-cutting steps shown in FIG. 3B.

Under the current method for cleaning evaporator coil 300, the line-cutting step is required whenever evaporator coil 300 is to be removed from inside housing unit 800 for cleaning. Because expansion valve 325 is permanently secured to evaporator coil 300, it remains attached to the removed evaporator coil 300. After the cleaned evaporator coil 300 is reinstalled in housing unit 800, the previously cut high-pressure line 100 and previously cut low-pressure line 200 must then be soldered (i.e., welded), resulting in solder joints 104 (high-pressure line solder) and 204 (low-pressure line solder). See FIG. 3C.

Referring again to FIGS. 3B, and 3C, repeat evaporator coil 300 cleanings using the current method will result in the introduction of a plurality of cuts and subsequent solder joints 104/204 in both high-pressure line 100 and low-pressure line 200 over the lifetime of evaporator coil 300 should evaporator coil 300 be subjected to recommended occasional cleanings as part of routine AC system maintenance. To prevent refrigerant leaks in either of or both of high-pressure line 100 and/or low-pressure line 200 following evaporator coil cleaning with the current prior art method, it is essential that the cut lines are always properly soldered before the previously collected refrigerant is reintroduced into the AC system.

Soldering is subject to several mistakes which may not be immediately apparent such as solder-starved joints and uneven joints, both of which are susceptible to cracking and failure. With AC system units, any such cracking/failure of these solder joints could well result in the undesirable loss of dangerous refrigerant into the air through cracks and increased energy costs. The greater the number of solders introduced into the high pressure and low-pressure lines, the greater the threat to the line's integrity and the possibility of refrigerant leaking over time. The cumbersome nature of the current evaporator coil cleaning method, including the requirement of always first isolating the refrigerant, may well discourage AC technicians from performing or even suggesting the evaporator coil cleaning procedure to the AC system's owner. On the other hand, the occasional cleaning of evaporator coil 300 is desirable to maintain the AC system's cooling efficiency throughout its lifetime and ensure that the AC system's refrigerant does not leak into the environment.

To eliminate the need to cut and weld the copper lines as part of an intensive evaporator coil 300 cleaning step, others have used special valves to block off the flow of refrigerant into and out of evaporator coil 300 through high-pressure line 100 and low-pressure line 200. With those methods, the objective is to securely retain the refrigerant within the evaporator coil 300 during removal for cleaning and subsequent replacement. That is, the refrigerant remains in the evaporator coil 300 throughout the cleaning step by the AC technician. Such methods are problematic because any accidental damage to the evaporator coil during removal and reinstallation may well cause leakage of the refrigerant. Also, any already-compromised evaporator coil, e.g., a coil with pinhole leaks, may also leak refrigerant during the cleaning process. Clearly the retention of refrigerant within a removed evaporator coil 300 is undesirable given the refrigerant's well-known environmental and health hazards.

The invention addresses the deficiencies with the above referenced current methods by: 1) requiring substantially less time and equipment; 2) eliminating the need to isolate any refrigerant from the system into a special container prior to removal of evaporator coil 300 for cleaning; and 3) eliminating the need to introduce another cuts and solders into lines 100 and 200 whenever evaporator unit 300 is to be removed from its housing unit 800 for cleaning.

Referring now to FIGS. 2, 4A, 4B, 5, 6A, 6B, and 7, the practice of the invention requires the permanent installation of operatively connected ball valve assembly unit 600 onto high-pressure line 100 and operatively ball valve assembly unit 700 onto low-pressure line 200, both ball valve assembly units having substantially the same components for practicing the inventive method. Both ball valve assembly units 600 and 700 comprise two threadedly connectable elements: a ball valve element 604b (704b) and a separable ball valve connector element 604a (704a). When connected, as shown in FIGS. 4A, 4B, and 7, ball valve assembly units 600 and 700 provide secure conduits for allowing refrigerant to flow into the AC system's evaporator coil 300 through high-pressure line 100 and back to condenser coil 400 through low-pressure line 200.

Both ball valve elements 604b and 704b comprise a shut-off valve for controlling the flow of refrigerant through high-pressure line 100 and the low pressure-line 200 by means of a rotary ball 622 having a bore. The bore may be a reduced bore or full bore. Not shown. As discussed below, rotation of the rotary ball 622 by ninety degrees or a quarter of turn around its axis will either allow or block the flow of refrigerant through high-pressure line 100 or low-pressure line 200, whichever the case may be. When refrigerant is flowing through the operatively connected ball valve assembly units 600 and 700, the rotary ball's refrigerant passage hole 626 is fully accessible to the refrigerant, thereby allowing the refrigerant to flow through the ball valve assembly units 600 and 700 and hence the high-pressure and low-pressure lines. See FIGS. 6A and 6B.

Practice of the invention requires a one-time copper line cutting step as shown in FIG. 3B to provide for the soldering of ball valve element 604a and ball valve connecting element 604b onto cut high-pressure line 100 and ball valve element 704a and ball valve connecting element 704b onto low-pressure line 200. See FIGS. 4A and 4B. Here, the cut lines are not resoldered to each other as is now required for the prior art's evaporator coil 300 cleaning procedure. See FIGS. 3B and 3C. Instead solders 611a, 711a, 611b and 711b result from the soldering of ball valve element 604b (704b) and ball valve connector element 604a (604b) in place. No further cutting or soldering of lines 100 and 200 is ever again required as the prerequisite for removing and cleaning evaporator coil 300 once the invention's two ball valve assembly units 600 and 700 are soldered onto lines 100 and 200.

Referring again to FIG. 8, where the invention's method is to be practiced with a previously installed and operational AC system, the first step of the method necessarily involves preparing the AC system for practice of the method. These preparation steps comprise: a) the removal and collection of refrigerant from the entire AC system into specialized refrigerant collection tank 900 using the regular procedure for pumping refrigerant from an AC system as described above; and b) cutting lines 100 and 200 to provide for the soldering of ball valve element 604b and ball valve element 604a onto cut high-pressure line 100 and ball valve element 704b and ball valve connecting element 704a onto low-pressure line 200. See FIGS. 3A and 3B which are applicable to preceding steps a and b. Once the invention's ball valve assembly units 600 and 700 are permanently soldered onto high-pressure line 100 and low-pressure line 200 as described below, this refrigerant removal and collection step need never again be performed as part of any evaporator coil 300 cleaning/inspection step.

For brand-new AC systems wherein refrigerant has not yet been introduced into the system, the initial refrigerant isolation step is not necessary. Here, a new AC system's high and low-pressure lines may instead be adapted to include ball valve assembly units 600 and 700 during the AC system's installation or even by the AC system's manufacturers. That is, the installer or manufacturer may proceed with the high-pressure line 100 and the low-pressure line 200 cutting steps to install ball valve assembly units 600 and 700 prior to introducing any refrigerant into the AC system.

Referring again to FIGS. 2, 4A, 4B, 5, and 7, the disclosed method is practiced in conjunction with ball valve assembly units 600 and 700, with each ball valve assembly unit comprising a ball valve element 604b (or 704b) and a ball valve connector element 704a (or 704b) to provide for the connection of and disconnection of bifurcated lines 100 and 200. For the purposes of this disclosure, bifurcated line refers to lines 100 and 200 which have been adapted to include ball assembly units 600 and 700 to provide for line 100's and 200's separation and reconnection during the practice of the method.

The following method steps are conducted with an already operational AC system that has first been entirely cleared of refrigerant as shown in FIGS. 3B and 8 or with a brand-new AC system wherein refrigerant has never been introduced into the AC system. As shown in FIG. 3B, the practice of the invention's method with ball valve assembly unit 600 requires that an initial cut 602 be made in the AC system's high-pressure line 100 to provide a bifurcated high-pressure line with an evaporator coil side segment 614*a* terminating in end 606*a* and a condenser coil side segment 614*b* terminating in end 606*b*. For orientation purposes, evaporator coil side segment 614*a* is the segment of bifurcated high-pressure line 100 closer to evaporator coil 300 and condenser coil side segment 614*b* is the segment of bifurcated high-pressure line 100 closer to condenser coil 400. Similarly, an initial cut 702 is made in the AC's unit's low-pressure line 200 to provide a bifurcated low-pressure line 200 having an evaporator coil side segment 714*a* terminating in end 706*a* and a condenser coil side segment 714*b* terminating in end 706*b*.

Referring again to FIG. 2, ball valve element 604*b* comprises a hollow cylindrical refrigerant transport body 608 terminating in a distal hollow stem portion 610 and a proximal threaded portion 612. Ball valve element 604*b* is permanently affixed to end 606*b* of condenser coil segment 614*b* by soldering hollow stem portion 610 onto end 606*b*. In an embodiment, hollow distal cylindrical stem 610's internal diameter is sufficient for slidingly receiving end 606*b* and a section of condenser coil side segment 614*b*'s through hollow stem portion's aperture (not shown) and through a portion of stem 610 to provide for the strong and effective soldering of ball valve element 604*b* onto condenser coil side segment 614*b* of bifurcated high-pressure line 100. For orientation purposes, proximal end refers to the unsoldered end of ball valve element 604*b* when this component is soldered onto condenser coil line segment 614*b* of bifurcated high-pressure line 100.

Ball valve connector element 604*a* comprises a distal hollow stem portion 640 with aperture 644, the stem portion being bored through a flared threaded nut portion 632. The internal diameter of distal hollow stem portion 640 is sufficient for slidingly receiving end 606*a* and a section of evaporator coil side segment 614*a* into and through aperture 644 and a portion of distal hollow stem portion 640 to provide for strong and effective soldering of ball valve connector element 604*a* onto evaporator coil side segment 614*a* of bifurcated low-pressure line 100. For orientation purposes, proximal end refers to the unsoldered end of ball valve connector element 604*a* when this component is soldered onto evaporator coil side segment 614*a* of bifurcated low-pressure line 100.

The above described and soldering steps are repeated with bifurcated low-pressure line 200 and ball valve assembly unit 700. Referring again to FIGS. 2, 4A, 4B, 5, and 7, the reconnection of the bifurcated high-pressure lines 100 and 200 having soldered ball element 604*b* (704*b*) and ball valve connector element 604*a* (704*a*) is achieved by inserting and securely tightening threaded proximal female stem 612 (712) of soldered ball valve element 604*b* (704*b*) into ball valve connector element 604*a*'s (704*a*'s) threaded male nut portion 632 (732).

Referring again to FIGS. 2, 5, 4B, 6A and 6B, the part of ball valve element 604*b* (704*b*) that both allows and stops the flow of refrigerant through installed ball valve assembly units 600 and 700 and hence through high-pressure line 100 and low-pressure line 200 is an inaccessible rotary ball 622 (722) positioned within hollow cylindrical refrigerant transport body 608 (708), the rotary ball 622 (722) having a centrally positioned refrigerant passage hole 626 (726) extending completely through rotary ball 622 (722). Rotary ball 622 (722) is permanently adjoined to an internal rotatable connecting shaft (not shown) that is attached to an outer accessible adjuster 631 (731) which provides for the manual rotation of the connecting shaft, rotary ball 622 (722) and, in turn, refrigerant passage hole 626 (726). The rotatable connecting shaft extends from the top of rotary ball 622 (722) through hollow conduit 627 (727), hollow conduit 627 (727) extending perpendicularly from the outer surface of ball valve element 604*b*'s hollow cylindrical refrigerant transport body 608 (708). The rotatable connecting shaft extends from the top of rotary ball 622 through conduit 627 to terminate in accessible adjuster 631(731).

Rotary ball 622 is positioned in its open position when the AC system is in operation to provide for the flow of refrigerant through ball valve assembly unit 600's (i.e., connected ball valve portions 604*a* and 604*b*) refrigerant passage hole 626 and into evaporator coil 300. In the open position, refrigerant passage hole 626 is thus aligned with the direction of the refrigerant's flow from condenser coil 400 to evaporator coil 300. See FIGS. 6A and 5.

To use the method's evaporator coil 300 cleaning and inspection procedure, rotary ball 622 must be in its closed position. The closed position is achieved by rotating rotary ball 622 from its open position by 90 degrees through the manual rotation of ball valve element 604*b*'s connecting shaft via accessible adjuster 631 to cause refrigerant passage hole 626 to no longer be accessible to refrigerant, i.e., the refrigerant is blocked from flowing towards evaporator coil 300. Instead, the refrigerant is retained behind rotary ball 622. When the flow of the refrigerant within the AC system is to be restored, the rotary ball is again adjusted by 90 degrees to cause refrigerant passage hole 626 to again be accessible to refrigerant. In an embodiment, the rotation of rotary ball 622 via adjuster 631 (731) may be automated.

The foregoing rotary ball rotation steps also apply to valve assembly unit 700 which is used with low-pressure line 200. Referring again to FIG. 4B, during practice of the invention's method for cleaning evaporator coil 300, refrigerant is prevented from getting past ball 722 when rotary ball 722 in its closed position while evaporator coil 300 is removed for cleaning. When the flow of refrigerant is to be restored, rotary ball 722 is rotated to its open position to restore the flow of refrigerant from condenser coil 400 to evaporator coil 300.

Referring again to FIG. 2, hollow conduit 627 (727)'s top threaded means 629 (729) provides for the securing of threaded safety locking nut (not shown). The locking nut protects adjuster 631 (731) from damage and inadvertent rotation.

Referring again to FIGS. 2 and 4B, the hollow cylindrical refrigerant transport body 608 (708) of ball valve element 604*b* (704*b*) further comprises an affixed pressure gauge access port 650 (or 750) positioned between proximal threaded stem 612 (712) and ball valve element 604*b*'s (704*b*'s) accessible adjuster 631 (731) for receiving a pressure gauge (not shown). Pressure gauges are used to monitor the flow of refrigerant through the AC system during practice of the method as described below. When not in use, access port 650 (750) may be protected by a removable threaded cap (not shown).

As shown in FIG. 2, both ball valve units 600 and 700 comprise the same components. Ball valve assembly 600 as used on high-pressure line 100 may have smaller overall dimensions relative to ball valve assembly 700.

Referring again to FIGS. 2, 4A and 4B, the invention's method for safely removing evaporator coil 300 from housing unit 800 for cleaning without having to first isolate refrigerant outside of the AC system is performed in connection with the installed ball assembly units 600 and 700. The method requires that steps be performed in a specific order to ensure that refrigerant is properly isolated from evaporator coil 300 prior to its removal from housing unit 800 for cleaning and safely retained in the rest of the AC system as shown in FIGS. 4B and 6B.

The following summarizes the required ball valve assembly unit 600 and 700 soldering steps that are required for practicing the inventive method in its specific sequence of steps. With already installed and operating AC systems, the refrigerant must first be removed from the AC system using steps substantially similar to the steps now required by the prior art. method for cleaning evaporator coils 300 as discussed above and as shown in FIG. 8. Once refrigerant has been effectively removed from the AC system and safely stored in container 900, the method's one-time steps of installing the ball valve assembly units 600 and 700 required for practicing the method are as follows:

1. Verify power to the A/C unit is disconnected. The power should already have been disconnected prior to the refrigerant removal step.
2. Start the refrigerant removal process using the hardware shown in FIG. 8. Verify that high-pressure and low-pressure lines 100 and 200 are clear of refrigerant using pressure gauges 920 before proceeding with the following steps.
3. Cut high-pressure line 100 at a point close to evaporator coil housing unit 800 to provide a bifurcated high-pressure line having an evaporator coil side segment 614a terminating in cut end 606a and a condenser coil side segment 614b terminating in cut end 606b.
4. Repeat step 3 with low-pressure line 200 to provide a bifurcated low-pressure line with an evaporator coil side segment 714a terminating in cut end 706a and a condenser coil side segment 714b terminating in cut end 706b.
5. Clean the four cut ends 606a, 606b, 706a, and 706b.
6. Solder distal hollow cylindrical stem portion 610 of ball valve element 604b to cut end 606b of high-pressure line 100. Solder distal hollow stem portion 640 of ball valve connector element 604a to cut end 606a. Preferably carry out the welding steps when the cut ends 606a and 606b have been inserted at least some distance into hollow cylindrical stem portion 610 and hollow distal stem portion 640 to provide for strong solders.
7. Repeat step 6 with ball value assembly unit 700 and low-pressure line 100 which has been cut to provide cut ends 706a and 706b.
8. If desired, the evaporator coil may be removed and cleaned at this time since the AC technician is already on the premises. Otherwise, the method user proceeds directly to step 10.
9. If the evaporator coil has been removed, install it into housing unit 800 before proceeding with step 10.
10. Connect threaded female stem 612 of ball valve element 604b to threaded male nut 632 of ball valve connector element 604a to provide a continuous passageway through high-pressure line 100 for the flow of refrigerant once reintroduced into the AC system.
11. Connect threaded female stem 712 of ball valve element 704b to threaded male nut 732 of ball valve portion 704a provide a continuous passageway through low-pressure line 200 of refrigerant once reintroduced into the AC system.
12. Verify rotary ball 622 and 722 of soldered assembly ball units 600 and 700 are in their open position to allow refrigerant to flow through and between both the high-pressure and low-pressure lines 100 and 200.
13. Remove protective caps from pressure gauge ports 650 and 750 and insert pressure gauges.
14. Resume power to the AC unit.
15. Commence the flow of pre-collected refrigerant stored in collection tank 900 through condenser coil 400 to provide refrigerant flow to evaporator coil 300 through high-pressure line 100 and back to condenser coil 400 through low-pressure line 200 using appropriate pumping hardware.
16. Check pressure gauges inserted into to ensure previously removed and stored refrigerant is properly flowing between condenser coil 400 and evaporator coil 300.
17. Close the outside condenser unit valves once previously collected refrigerant has been re-introduced into the AC system.
18. Replace protective caps to protect the integrity of pressure gauge ports 650/750 and adjustable valves 622/722 of the installed ball valve assembly units 600 and 700 to prevent refrigerant evaporation.

Once ball valve elements 600 and 700 have been welded onto cut high-pressure line 100 and low-pressure line 200 and the homeowner or building owner wishes to have the evaporator coil 300 removed and cleaned, the inventive method is practiced as follows. The method provides for complete isolation of refrigerant from the evaporator coil 300 prior to its removal for cleaning without the need to ever separately collect the refrigerant in a separate container again. All refrigerant is now instead safely retained within the rest of the AC system as shown in FIG. 4B until the evaporator coil 300 is again in place and the flow of refrigerant through the AC system is ready to be restored after the bifurcated high-and-low-pressure lines have been threadedly reconnected as shown in FIG. 5 and discussed above.

With brand new AC systems, wherein no refrigerant has yet been introduced into the AC system, the above steps 1 and 2 related to the collection of refrigerant are eliminated. Additionally, refrigerant need not be added until the AC system is ready for actual operation. In this scenario, the above steps 10-16 are conducted when refrigerant is to be added to the new AC system, generally upon its installation. Here, the new system will simply be charged with new refrigerant with ball valve assemblies adjusted to allow the flow of refrigerant through the refrigerant passage holes 626 and 726.

Once ball valve assemblies 600 and 700 have been soldered onto cut high-pressure line 100 and low-pressure line 200 and the AC system's owner later wishes to have evaporator coil 300 removed and cleaned, the inventive method is practiced according to the following method steps. With the AC unit running, remove the cap from the pressure gauge access port 650 of high-pressure line 100 and insert an appropriate pressure gauge. At this stage, refrigerant is still flowing into and out of evaporator coil 300.

1. Manually or electronically rotate accessible adjuster 631 to cause the rotation of the internal shaft connecting the accessible adjuster 631 to rotary ball 622 to cause the simultaneous rotation of rotary ball 622 by 90 degrees to block refrigerant within high-pressure line 100 from flowing beyond rotary ball 622 by removing access to refrigerant passage hole 626.
2. With the AC unit running, transfer all of the remaining refrigerant in the evaporator unit 300 out of the evaporator through low-pressure line 200. During this step, rotary ball 722 is in its open position.

3. Once the previously inserted pressure gauge reading is at 0 psi verifying that refrigerant has been completely removed from evaporator coil 300, remove the cap from connecting shaft 727 to expose accessible adjuster 731 and rotate accessible adjuster 731 by 90 degrees to cause the simultaneous rotation of rotary ball 722 to its closed position to prevent the loss of refrigerant that has been removed from evaporator coil 300 by this step when ball valve assembly 700 is disconnected.
4. Shut the A/C unit off.
5. Disconnect high-pressure line 100's ball valve element 604*b* from ball valve connecting element 604*a*.
6. Disconnect high-pressure line 200's ball valve element 704*b* from ball valve connecting element 704*a*.
7. Remove evaporator coil 300 from its housing unit 800 for inspection and/or cleaning using appropriate cleaning agents. The removed evaporator coil 300 includes the bifurcated evaporator coil side segments to which ball valve connector elements 604*a* and 704*a* were previously soldered.
8. After cleaning, replace evaporator coil 300 back into its housing frame 800.
9. Reconnect previously disconnected_high-pressure line 100 by tightening threaded male nut portion 632 of ball valve connecting element 604*a* onto threaded female stem portion 612 of ball element 604*b*. Repeat this step with elements 704*a* and 704*b* to reconnect previously disconnected low-pressure line 200.
10. Perform a short vacuum using one or more pressure gauges to monitor the removal of air and humidity from evaporator coil 300 by reversibly attaching a vacuum pump hose(s) to one or both access ports of the high and low-pressure lines.
11. Ensure that the adjustable balls 622 and 722 are both in their closed positions during this vacuum step as shown in FIG. 6B.
12. Slowly open ball valve element 600 of high-pressure line 100 by turning connecting shaft 627 by 90 degrees to cause low-pressure line 100 to resume the flow of refrigerant from condenser coil 400 into evaporator coil 300.
13. Slowly open ball valve element 700 of low-pressure line 100 by turning adjustable connecting shaft 727 by 90 degrees to cause low-pressure line 200 to receive refrigerant from evaporator coil 300 once refrigerant flow to it has been restored to evaporator coil 300 under step 13.
14. Restore power to the AC system.
15. Using pressure gauges, monitor the restoration of refrigerant flow from condenser coil 400 through high-pressure line 100 into cleaned evaporator coil 300 and back to the compressor 500/condenser coil 400 through low-pressure line 200.

The above method steps are repeated whenever removal of an evaporator coil 300 is deemed necessary for thorough cleaning and/or for routine maintenance. The method is also applicable if removal of evaporator coil 300 is deemed necessary to determine if it is damaged and should be replaced. That is, the method is readily amenable to monitoring the integrity of evaporator coil 300 throughout the lifetime of the AC unit.

The specific ball value assembly units 600 and 700 are designed to provide a way to minimize the possibility of the weak and cracked solders that are known to occur when two, e.g., rods to be soldered have the same diameter (e.g., as in cut high-pressure line 100 under the prior art's evaporator coil cleaning method) are soldered. As discussed above, the design provides for the insertion of the ends of the cut high-pressure or low-pressure lines 100 and 200 to be inserted into hollow distal stem portion 610 (710) or 640 (740), whichever the case may be, prior to soldering.

The method offers substantial advantages over the current method for maintaining evaporator units because it entirely eliminates the need to deal with environmentally-dangerous HCFCs types of refrigerants outside of the AC system. The invention is not, however, limited to usage with just HCFCs. New AC systems do use refrigerants that are less likely to harm the ozone layer relative to HCFCs. Nevertheless, any poorly maintained air-conditioner unit system will have a negative impact on the environment because of increased energy usage regardless of the refrigerant. Accordingly, the method has multiple environmentally-related benefits: 1) it substantially reduces the possibility of dangerous ozone-depleting refrigerant release into the atmosphere and/or their mishandling during evaporator coil cleaning and inspection; 2) its simplicity will encourage home owners and building maintenance staff to have AC units maintained and inspected more frequently, thereby promoting more efficient energy consumption; and 3) it helps ensure that the integrity of the AC system's high and low pressure lines, no matter what refrigerant is present, is maintained by eliminating the need to introduce a new solder every time the evaporator coil is to be removed for cleaning and inspection.

Directional terms such as "front", "back", "in", "out", "downward", "upper", "lower", "top", "bottom", "proximal" or "distal" and the like may have been used in the description. These terms are applicable to the embodiments shown and described in conjunction with the drawings. The terms are merely used for the purpose of description in connection with the drawings and do not necessarily apply to the position in which the multi-washer apparatus may be used.

While the invention has been described with reference to various embodiments, it will be understood by those skilled in the art that various changes may be made and equivalents may be substituted for elements thereof without departing from the scope of the invention. In addition, many modifications could be made to adapt a particular situation or material to the teachings of the invention without departing from the essential scope of the invention thereof.

I claim:

1. An eco-friendly method for a removing of and cleaning of a currently operating air conditioner system's evaporator coil without having to first remove refrigerant from the air conditioner system comprising the steps of first converting an existing air conditioner system to a specially adapted air condition system, comprising the steps of:
   a. Transferring all refrigerant present in the operating air conditioner system's high-pressure line, low-pressure line, evaporator coil, condenser coil, and condenser to a refrigerant recovery tank;
   b. Preparing for a soldering of a first ball valve element and a first ball valve connector element onto the air conditioner system's high-pressure line by introducing a cut into the high-pressure line near the outside of an evaporator coil's housing unit to provide a bifurcated high-pressure line comprising an evaporator coil side segment with a free end and a condenser coil side segment with a free end;
   c. Preparing for a soldering of a second ball valve element and a first ball valve connector element onto the air conditioner's system low-pressure line near the outside of the evaporator coil's housing unit to provide a bifurcated high-pressure line comprising an evaporator coil side segment with a free end and a condenser coil side segment with a free end;

d. Soldering the first ball valve element to the free end of the bifurcated high-pressure line's condenser coil side segment, the first ball valve element comprising at least a distal hollow cylindrical stem for soldering the ball valve element to the free end of the bifurcated high-pressure line's condenser coil side segment, a proximal threaded female stem, a rotary ball connected to an internal rotating shaft, and a pressure gauge port having a protective cap, the rotary ball having a refrigerant passage hole;

e. Soldering the first ball valve connector element to the free end of the bifurcated low-pressure line's evaporator side coil, the first ball valve connector element comprising a hollow cylindrical stem portion for soldering the ball valve connector element to the free end of the bifurcated high-pressure line's evaporator coil segment and a proximal threaded male nut;

f. Soldering the second ball valve element to the free end of the bifurcated low-pressure line's condenser coil side segment, the second ball valve element comprising at least a distal hollow cylindrical stem portion for soldering the second ball valve element to the free end of the bifurcated high-pressure line's condenser coil segment, a proximal threaded female stem, a rotary ball having a refrigerant passage hole connected to an internal rotating shaft, and a pressure gauge port;

g. Soldering a second ball valve connector element to the free end of the bifurcated low-pressure line's evaporator side coil, the second ball valve connector element comprising a distal hollow cylindrical stem portion for soldering the second ball valve connector element to the free end of the bifurcated high-pressure line's evaporator coil segment and a proximal threaded male nut;

h. Providing an operatively connected first ball valve assembly by connecting the proximal threaded male nut of the soldered first ball valve connector element to the proximal threaded female stem of the soldered first ball valve element;

i. Providing an operatively connected second ball valve assembly unit by connecting the proximal threaded male nut of soldered second ball valve connector element to the proximal threaded female stem of the soldered second ball valve element;

j. Rotating the internal rotating shaft comprising the first ball valve assembly unit to allow an unrestricted movement of refrigerant from the air conditioner system's condenser coil to its evaporator coil through the high-pressure line's first ball valve assembly unit's refrigerant passage hole;

k. Rotating the internal rotating shaft comprising the second ball valve assembly unit to allow the unrestricted movement of refrigerant from the air conditioner system's evaporator coil to the condenser coil through the low-pressure line's first ball valve assembly unit's refrigerant passage hole;

l. Resuming power to the air conditioner system;

m. Pumping the previously collected refrigerant into the air conditioner system causing it to circulate through the high-pressure line to the evaporator coil and back to a compressor and condenser coil through the low-pressure line condenser coil to provide an operational adapted air conditioner (AC) unit;

n. Using pressure gauges inserted into the first and second ball valve assembly units' pressure gauge ports to ensure refrigerant is properly flowing between the condenser coil and the evaporator coil and vice versa;

o. Removing the pressure gauges when acceptable pressure readings are obtained; and p. Covering the pressure gauge ports with protective caps to prevent refrigerant evaporation through the high-pressure line or low-pressure line while the adapted air conditioner system is operating.

2. The method of claim 1 wherein the specially adapted air conditioner system provides a method for safely removing the adapted air conditioner's evaporator coil for cleaning without first having to collect the adapted air conditioner's circulating refrigerant in a refrigerant recovery tank comprising the steps of:

a. With the AC unit running, removing the protective cap from the pressure gauge port of the high-pressure line's first soldered ball valve assembly and inserting an appropriate pressure gauge;

b. With the AC unit still running, removing the protective cap from the pressure gauge port of the low-pressure line's' second ball valve assembly and inserting an appropriate pressure gauge;

c. Rotating the internal rotating shaft of the first soldered ball valve assembly unit by 90-degrees to cause the rotation of the rotary ball to block a flow of refrigerant in the high-pressure line beyond the rotary ball;

d. With the AC unit still running, waiting for substantially all of the refrigerant in the evaporator coil to flow through the low-pressure line past the second soldered ball valve assembly unit;

e. Once the pressure gauge readings in the low-pressure line and high-pressure line are substantially 0 psi, rotating the internal rotating shaft of the second soldered ball valve assembly unit by 90-degrees to cause the rotation of the rotary ball to prevent a backup of any refrigerant beyond the rotary ball;

f. Shutting the AC unit off;

g. Disconnecting the first soldered ball valve assembly unit by unscrewing the first ball valve element's proximal threaded female stem from the first ball valve connecting element's proximal threaded male nut to provide a bifurcated low-pressure line 100;

h. Repeating step g with the second soldered ball valve assembly unit to provide a bifurcated high-pressure line 200;

i. Removing the evaporator coil from the air conditioner unit's housing unit for inspection and cleaning;

j. After cleaning, installing evaporator coil 300 back into its housing unit;

k. Securely reconnecting the bifurcated low-pressure line by threadedly connecting the first ball valve element's threaded stem with the first ball valve connector's threaded male nut;

l. Securely reconnecting bifurcated high-pressure line by threadedly connecting the second fall element's threaded stem with the second ball vale connector's threaded male nut;

m. Performing a short vacuum using one or more pressure gauges to monitor the removal of air and humidity attaching a vacuum pump hose(s) to one or both pressure gauge access points of the high-pressure line and the low-pressure line;

n. Readying the first ball valve assembly for the resumption of refrigerant flow through the high-pressure line by slowly turning the adjustable internal rotating internal connecting shaft to cause the rotary ball's refrigerant passage hole to again be accessible to refrigerant;
o. Readying the second ball valve assembly for a resumption of refrigerant flow through the low-pressure line by slowly turning the adjustable to cause the rotary ball's refrigerant passage hole to again be accessible to refrigerant;
p. Restoring power to the air conditioner system;
q. Using pressure gauges inserted into the pressure gauge ports of the high-pressure line's ball valve unit and the low-pressure line's low-pressure line valve unit, monitoring the restoration of refrigerant flow from the condenser coil through high-pressure line 100 into cleaned evaporator coil and back to the condenser coil through low pressure line;
r. Removing the inserted pressure gauges and capping the pressure gauge ports of the high-pressure line's valve unit and the low-pressure line's valve unit; and
s. Repeating step a-r as needed to remove the adapted air conditioner system's evaporator coil for cleaning.

3. The method of claim 1 wherein the second ball valve element and the second ball valve connector element are soldered onto the bifurcated low-pressure line before the first ball valve element and the first ball valve connector element are soldered onto the bifurcated high-pressure line.

4. The method of claim 1 wherein the specially adapted air conditioner system comprises a new air conditioner system having no previously introduced refrigerant wherein initial refrigerant collection step 1*a* is eliminated.

\* \* \* \* \*